3,667,810
COMBINATION BRAKE WARNING SWITCH AND PROPORTIONING VALVE
Richard J. Silagy, Parma, Ohio, assignor to The Weatherhead Company, Cleveland, Ohio
Filed Apr. 22, 1970, Ser. No. 30,887
Int. Cl. B60t 8/26, 11/34, 17/22
U.S. Cl. 303—6 C
6 Claims

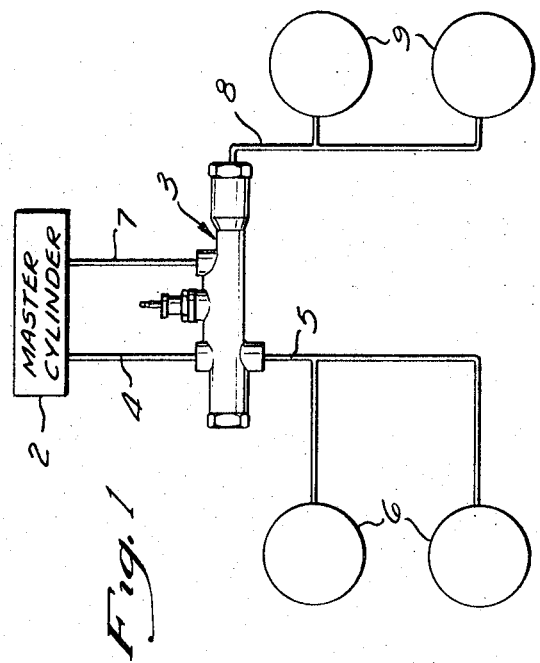
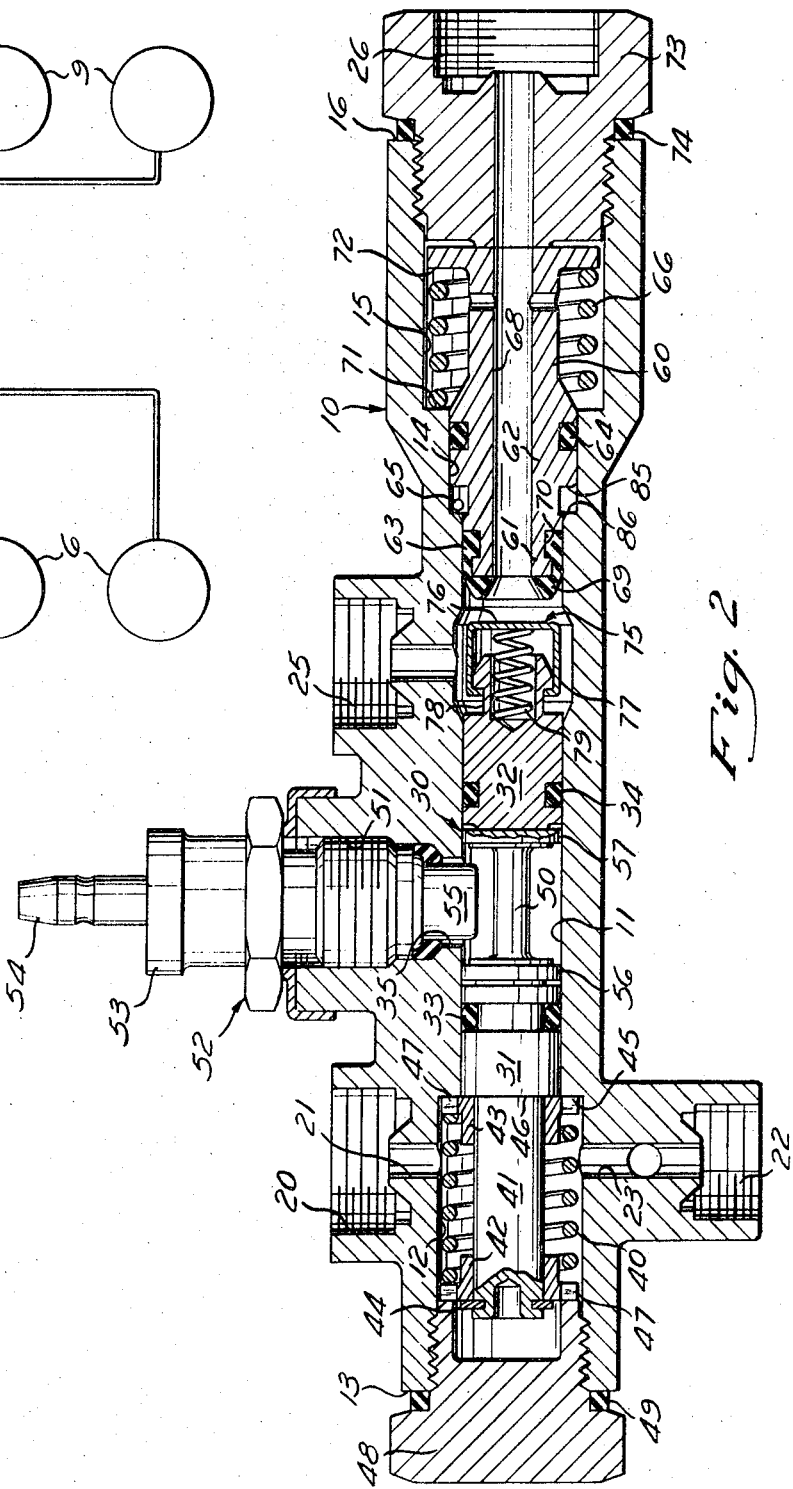

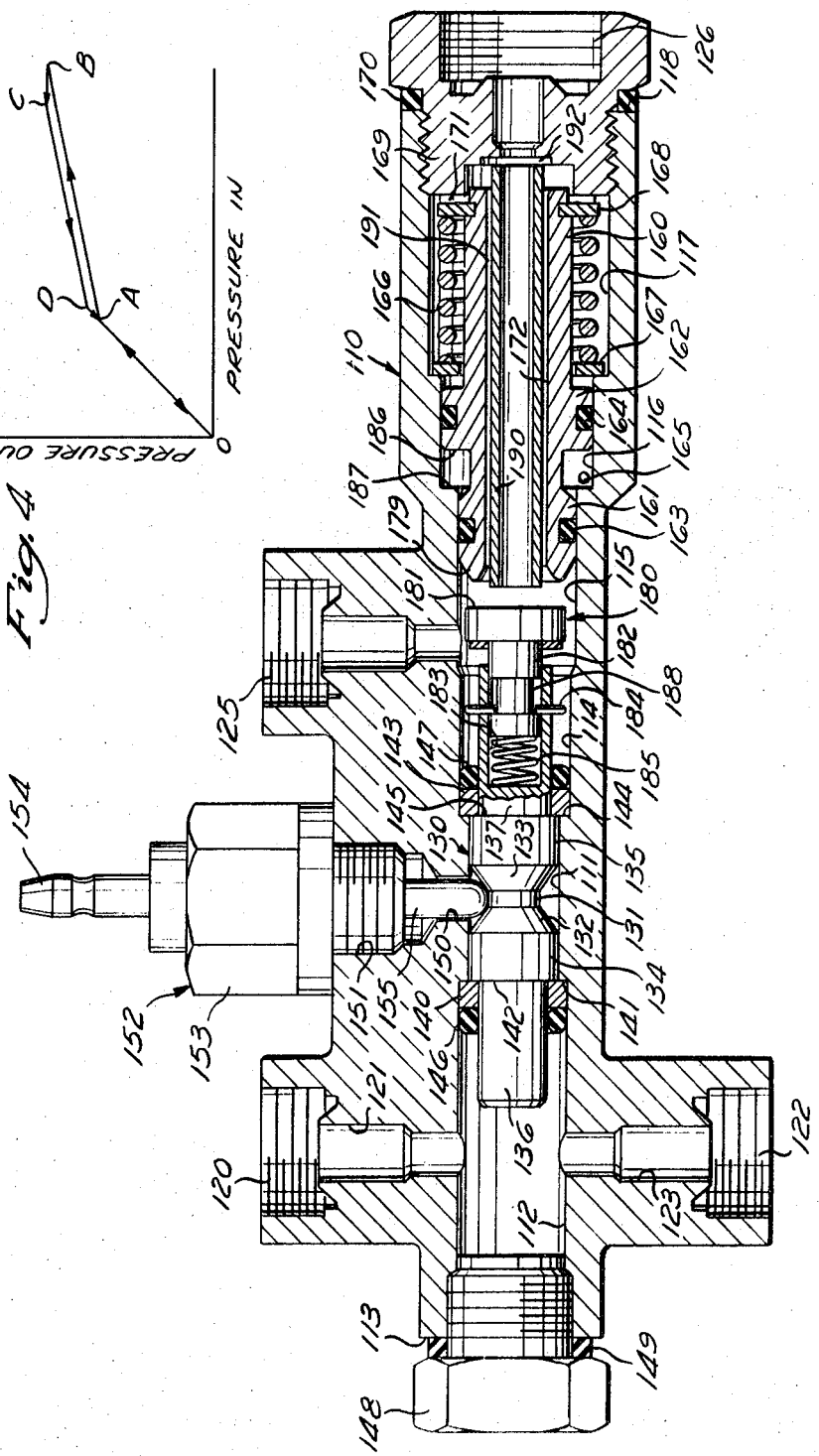
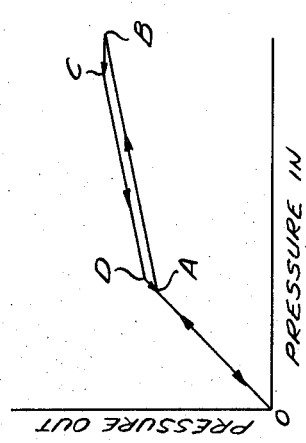
Fig. 4
Fig. 3
INVENTORS
RICHARD J. SILAGY
BY
McNENNY, FARRINGTON, PEARNE & GORDON
ATTORNEYS United States Patent Office 3,667,810
Patented June 6, 1972

ABSTRACT OF THE DISCLOSURE

A combination brake warning switch and proportioning valve includes a housing having an axial bore within which is located a switch piston and a proportioning piston at opposite ends of the bore. Fluid from two circuits of a dual brake system master cylinder is introduced to the bore on opposite sides of the switch piston which performs a switch actuating function in case of a pressure unbalance. The proportioning valve piston cooperates with a valve seat member slidably carried on the end of the switch piston to reduce the outlet pressure in one circuit when the inlet pressure exceeds a predetermined level. In the event of failure of the other circuit, movement of the switch piston moves the valve seat member away from the proportioning piston which is then inoperable. When the proportioning valve is operative, the movable valve seat member cooperates with the proportioning piston so that the proportional relation between inlet and outlet pressures in the one circuit is maintained when the pressures are decreasing. A stop is provided to prevent the valve seat member from engaging the proportioning piston in the event of a pressure loss in the one circuit.

BACKGROUND OF THE INVENTION

This invention relates generally to fluid pressure proportioning valves that are operable to maintain an oulet pressure a differential below the inlet pressure after a predetermined inlet pressure is reached or exceeded. More specifically, this invention relates to such proportioning valves that include a fluid pressure switch operable to complete an electrical circuit in the event of a predetermined pressure differential in a fluid pressure system.

Hydraulic brake systems for motor vehicles, and particularly hydraulic brake systems for automobiles and small trucks, generally include a first fluid pressure circuit for the front wheel brakes and a second fluid pressure circuit hydraulically isolated from the first circuit for the rear wheel brakes. In this manner, a fluid pressure failure in one of the circuits does not render the entire brake system inoperable, since the other circuit will still operate to supply fluid pressure to its associated wheel brakes. Such motor vehicle dual hydraulic brake systems are commonly provided with a proportioning valve to provide a lower fluid pressure to the rear wheel brakes than to the front wheel brakes under severe braking conditions. This prevents premature lock up of the rear wheel brakes of the vehicle, which might otherwise be caused by a weight decrease on the rear wheels resulting from a weight transfer from the rear wheels to the front wheels upon rapid deceleration. To alert the vehicle operator of a failure in one of the two circuits of such a dual brake system, a warning switch is also commonly provided which is operable to complete an electrical circuit to actuate an audio or visual warning device in the event of a predetermined pressure differential between the two circuits which would indicate a fluid pressure failure in one of the circuits.

It has been found to be desirable in such dual brake systems incorporating proportioning valves to eliminate the function of the proportioning valve in the event of a fluid pressure failure in the front circuit. This is generally done to provide full brake pressure to the rear brakes under such emergency conditions to insure that the motor vehicle will stop under such emergency conditions in a minimum distance with any given brake pedal effort. In order to eliminate the proportioning function of the proportioning valve in such system, various bypass devices have been suggested or used in the past to bypass the proportioning valve in the event of a fluid pressure failure in the front circuit. Prior art bypass devices have generally included a bypass passage, and a normally closed valving device in the bypass passage for opening the bypass in the event of a fluid pressure failure in the front circuit to bypass the proportioning valve and supply fluid from the master cylinder rear pressure chamber directly to the rear wheel brakes. Because the warning switch generally includes an actuating piston for movement in response to the fluid pressure differential, this movement of the switch actuating piston has been used in the prior art to actuate the valving means to open the bypass when there is a fluid pressure differential indicative of a fluid pressurre failure in the front circuit.

Although such proportioning valve bypass arrangements have been used in the prior art, they are nevertheless subject to certain disadvantages. One such disadvantage is that they require both a bypass and a valving means for opening and closing the bypass passage. This not only necessitates additional component parts and machining, but, if the bypass valving means leaks or is otherwise defective, the proportioning valve will not operate properly under normal conditions. Another disadvantage of such prior art bypass arrangements is that the bypass valving means may become worn after a failure due to continued application and release of the brakes which would result in a continued opening and closing of the bypass valving means as the switch actuating piston is moved back and forth upon each application and release of the brakes until the brake system is repaired. This may sufficiently wear the bypass valving means so that it does not properly close the bypass passage after the system has been repaired and it is desired to once again have the proportioning valve in the rear brake circuit.

Another problem associated with prior art proportioning valves relates to maintaining the proportional relationship between the inlet and outlet pressures the same when the pressures are decreasing as the proportional relationship between the inlet and outlet pressures when the pressures are increasing. One prior art proportioning valve is described in U.S. patent application of Ellis M. Wellman, Ser. No. 813,820, filed Apr. 7, 1969. Although this last mentioned proportioning valve operates to increase the outlet pressure in proportional relationship to the inlet pressure after a predetermined pressure obtains, this proportional relationship is not maintained when the pressures subsequently decrease, such as when the brakes are released. Instead, the outlet pressure remains substantially constant while the inlet pressure decreases to a pressure at which it substantially equals the outlet pressure. This characteristic of certain prior art proportioning valves is undesirable because it does not permit the ideal relationship between front wheel brake pressure and rear wheel brake pressure to be maintained under all conditions when the proportioning valve is used in a motor vehicle.

SUMMARY OF THE INVENTION

The present invention overcomes these and other problems and disadvantages of prior art fluid pressure proportioning valves by providing a simple and inexpensive proportioning valve which precludes the necessity of a bypass passage and of a valving means for opening and closing the bypass passage. The invention also provides a proportioning valve which maintains substantially the same proportional relationship between inlet and outlet pressures when the pressures are decreasing as the proportional relationship between inlet and outlet pressures when the pressures are increasing.

The preferred embodiments of the invention provide a fluid pressure proportioning valve which includes a housing having a bore therein, and a fluid inlet and a fluid outlet communicating with the bore. A valve seat member is disposed in the bore, and a differential area piston means is slidably mounted in the bore for movement to and from the valve seat member. The piston means includes a passage extending axially at least partially therethrough, and one end of the piston means around the axial passage defines a valve head for cooperating with the valve seat member to control fluid flow from the fluid inlet to the fluid outlet through the axial passage. When the inlet and outlet pressure increase to a predetermined pressure level, the greater axial force on the larger area portion of the differential area means moves the piston means so that the valve head engages the valve seat to isolate the fluid inlet from the fluid outlet. Any further increases in the fluid inlet pressure above the predetermined pressure acts on the smaller area portion of the differential area means so that the outlet pressure is increased by only a fractional amount of the further inlet pressure increase due to the difference between the piston area exposed to inlet pressure and the piston area exposed to outlet pressure. Should any make-up fluid be required, the valve head will move away from its valve seat to permit the required make-up fluid to flow through the axial passage.

The preferred embodiments of the invention further provide a means to maintain the proportional relationship between inlet and outlet pressures substantially the same when the pressures are decreasing as the proportional relationship when the pressures are increasing, by providing a valve seat which is movably mounted in the bore and a spring means which biases the valve seat toward the valve head. In this manner, when the inlet pressure is decreased from a pressure greater than the predetermined trigger pressure, the differential forces acting on the proportioning piston will displace the proportioning piston and valve seat together to decrease the outlet pressure. The differential area means of the proportioning piston maintains the proportional relationship between the outlet and inlet pressures upon such a pressure decrease substantially the same as the proportional relationship between the inlet and outlet pressures upon increasing pressures. When the inlet and outlet pressures decrease to the predetermined trigger pressure, the proportioning piston will return to its inoperative position spaced away from the valve seat member. Under certain operating conditions described in detail hereinafter, the movably mounted valve seat also serves as a return flow check valve to reestablish fluid pressure communication between the outlet and inlet. According to a first embodiment, the valve head is a resilient annular member carried by the proportioning piston means, and the resilient annular member includes an outer peripheral portion sealing against the bore. According to a second embodiment, the valve head is of the same material as the piston means, and the valve seat is a resilient plug member having a generally flat end face adjacent the valve head.

The preferred embodiments of the invention further provide such a fluid pressure proportioning valve in which the proportioning valve may be effectively removed from the rear brake circuit in the event of a front circuit pressure failure without necessitating either a bypass passage or a valve means for closing such a bypass passage. According to this aspect of the invention, the proportioning valve includes a switch piston in the housing for actuating an electric switch contact mechanism in response to movement of the switch position resulting from a fluid pressure differential indicating a failure in the front or rear circuit. The valve seat of the proportioning valve is mounted on and carried by the switch piston, so that movement of the switch piston away from the proportioning piston in response to a fluid pressure failure in the front circuit moves the valve seat away from the valve head to prevent isolation of the fluid inlet from the fluid outlet when the predetermined pressure is reached. By simply moving the valve seat from its normal position to a position in which it will not cooperate with the proportioning piston valve head to isolate the inlet from the outlet, the invention provides a simple and inexpensive means for rendering the proportioning valve inoperable. This permits the full braking pressure to be supplied to the rear wheel brakes in the event of a front circuit failure to insure that the automobile will stop in the shortest possible distance with a given brake pedal effort under such emergency conditions.

The second embodiment of the invention also provides a stop means arranged to prevent sealing engagement of the valve head and valve seat to prevent isolation of the fluid inlet from the fluid outlet when the switch piston is moved in a direction toward the proportioning piston in response to a fluid pressure unbalance which may be transient and not indicative of a failure in the rear circuit. In the second embodiment, the stop means is an elongated tubular member slidably disposed in the axial bore of the piston means, and a sufficient clearance is provided between the outer diameter of the tubular member and the inner diameter of the axial passage to permit fluid flow through the annular passage defined thereby when the switch piston is moved in a direction toward the piston means to actuate the electric switch contact mechanism.

BRIEF DESCRIPTION OF THE DRAWINGS

These and other aspects and advantages of the invention will become more readily apparent upon a full understanding of the drawings, wherein:

FIG. 1 is a schematic circuit diagram of a dual hydraulic brake system incorporating a proportioning valve according to the principles of the invention;

FIG. 2 is a cross-sectional side elevational view of a preferred embodiment of a fluid pressure proportioning valve according to the principles of the invention;

FIG. 3 is a cross-sectional side elevational view of a second embodiment of a fluid pressure proportioning valve according to the principles of the invention; and FIG. 4 is a graphical representation of the relationship between the inlet pressure and the outlet pressure for the rear circuit of the system shown in FIG. 1 when either the valve shown in FIG. 2 or the valve shown in FIG. 3 is used therein.

DESCRIPTION OF THE PREFERRED EMBODIMENTS

Referring now to the drawings in greater detail, FIG. 1 shows a schematic circuit diagram of a dual hydraulic brake system hydraulic circuit in which a proportioning valve according to the principles of the invention may be used. The circuit includes a dual master cylinder 2 having a front circuit pressure chamber (not shown) and a rear circuit pressure chamber (not shown). The front pressure chamber supplies hydraulic fluid to a proportioning valve 3 through a hydraulic line 4. A suitable hydraulic line 5 supplies the hydraulic fluid from the front pressure chamber of the master cylinder 2 and the proportioning valve 3 to front brakes 6 of the motor vehicle in which the fluid pressure circuit is incorporated. In a similar manner, a suitable hydraulic line 7 supplies fluid from the rear pressure chamber of the dual master cylinder to the proportioning valve 3. A suitable connecting line 8 supplies hydraulic fluid from the rear pressure chamber and the proportioning valve 3 to rear brakes 9 of the motor vehicle.

First embodiment

Referring now to FIG. 2, a first embodiment of a proportioning valve is shown which may be used in the motor vehicle dual brake system shown in FIG. 1. The valve includes a housing 10, which is preferably of extruded brass but which alternatively may be of any other desired material. An axial bore extends from end to end through the housing, and includes a bore 11 in the central portion of the housing and a first counterbore 12 which extends from the bore 11 leftwardly to a left end face 13 of the housing 10. A second counterbore 14 and a third counterbore 15 extend rightwardly from the bore 11 to a right end face 16 of the housing 10. At the left side of the valve housing 10, a fluid inlet port 20 is provided which may be suitably connected to line 4 to receive fluid from the front pressure chamber of dual master cylinder 2, and which communicates with the counterbore 12 by a radial passage 21. A fluid outlet port 22 is also provided which may be suitably connected to line 5 to distribute the brake fluid from the master cylinder front pressure chamber to the slave cylinders of the two front wheels 6, and which communicates with the counterbore 12 by a radial passage 23. In a similar manner, on the right side of the valve housing 10 a fluid inlet port 25 is provided which may be suitably connected to line 7 to receive hydraulic brake fluid from the rear pressure chamber of dual master cylinder 2. An outlet port 26 is also provided which may be suitably connected to line 8 to distribute hydraulic brake fluid from the inlet port 25 to the two rear wheel brakes 9. Each of the described ports is threaded for receiving a suitable fitting, which is preferably of the inverted flare type.

Slidably disposed within the bore 11 is a warning switch actuating piston assembly 30, which includes a left piston member 31 and a right piston member 32. The left piston member 31 is provided with an elastomeric O-ring seal 33 for hydraulically isolating the fluid of the front circuit in the counterbore 12 from the fluid of the rear circuit and for preventing loss of fluid from the front circuit through the warning switch mechanism as will be described hereinafter. In a similar manner, the right piston member 32 is also provided with an elastomeric O-ring seal 34 which prevents fluid communication between the rear circuit and the front circuit and which prevents loss of fluid from the rear circuit through the warning switch mechanism. The O-ring seals 33 and 34 are arranged in this manner on the left and right piston members 31 and 32, respectively, so that the left piston member can be assembled from the left end of the bore 11 and the right piston member 32 can be assembled from the right side of the bore 11. This prevents any damage to the seals 33 and 34 that might otherwise occur if the piston were assembled from one end of the bore 11 and one of the seals had to pass transverse bore 35.

A coil spring 40 surrounds a reduced diameter projecting end portion 41 of the left piston member 31 and acts between retainers 42 and 43. The left retainer 42 is held in place on the end portion 41 by a snap ring 44, and the right retainer 43 is positioned by abutment against an annular shoulder 45 of the housing 10 and an annular shoulder 46 of the left piston member 31. In this manner, the coil spring 40 provides a spring bias means to prevent movement of the piston assembly 30 in either direction within the bore 11 from the normally centered position shown in FIG. 2. Each retainer 42 and 43 is provided with a plurality of passages 47 so that the retainers 42 and 43 will not isolate portions of the left piston member 31 from free fluid communication with the fluid pressure in the counterbore 12. After the left piston member 31 has been assembled within the bore 11, an end plug 48 and sealing gasket 49 may be secured in place to close the left end of the axial bore.

The right end of the left piston member 31 is provided with a reduced diameter portion 50 interspacing larger diameter portions 56 and 57 of the piston member 31, and the right piston member 32 abuts the right larger diameter portion 57 to move the left piston member to the left. The transverse bore 35 opens to a larger diameter threaded portion 51, into which is threadably received a switch contact mechanism 52. The switch contact mechanism 52 includes a switch contact body 53, which is preferably made of an insulating material such as nylon or the like. The insulating body 53 carries a contact element 54 and a contact stud 55 which is electrically connected to the element 54 and which projects into the bore 11 adjacent the smaller diameter piston portion 50. When the valve shown in FIG. 2 is connected in the circuit shown in FIG. 1 as explained above, the contact element 54 may be electrically connected to the ground terminal of an audio or visual warning device so that the device will be activated when the contact element 54 is grounded through the switch housing 10. In this manner, when the piston member 31 is displaced to the right or left from the centered position shown in FIG. 2, one or the other of the larger diameter portions of the member 31 interspaced by the reduced diameter portion 50 will engage the contact stud 55 to ground the contact element 54 through the housing 10 to actuate the warning device. Because the left side of the piston assembly 30 is exposed to the fluid pressure of the front circuit and the right side of the piston assembly 30 is exposed to the fluid pressure of the rear circuit, this displacement of the piston assembly from its centered position will occur whenever there is a substantial fluid pressure unbalance between the front and rear circuits, such as would indicate a fluid pressure failure in one or the other circuit.

Slidably disposed within the right end of the axial bore in the valve housing 10 is a proportioning valve piston 60. The proportioning valve piston 60 includes a smaller diameter portion 61 and a larger diameter portion 62 disposed in the bore 11 and counterbore 14, respectively. Sealing engagement between the smaller diameter portion 61 and the bore 11 is maintained by a seal 63. In a similar manner, sealing engagement between the larger diameter portion 62 and the counterbore 14 is maintained by a seal 64. A vent passage means 65 is provided in the housing 10 to maintain the differential area between the portion 61 and the portion 62 at atmospheric pressure. A coil spring 66, which acts between a shoulder 71 of the housing 10 and a shoulder 72 of the proportioning piston 60, biases the proportioning piston 60 to the position shown in FIG. 2. In this position, the right end face of the proportioning piston 60 butts against the left end face of a plug member 73 which is threadably received by the counterbore 15 and which seals against the right end face 16 of the housing 10 by the seal 74. An axial passage 68 extends from end to end through the proportioning piston 60 and provides the sole means for fluid pressure communication between the inlet port 25 and the outlet port 26.

To control fluid flow through the axial passage 68, a valve head 69 is provided on the proportioning piston 60. As shown in the first embodiment, the valve head 69 and the seal 63 are of one piece construction to simplify the structure of the valve. This seal and valve head is snapped into an annular groove 70 in the proportioning piston to secure the valve head and seal thereto.

Under low pressure conditions, such as occur in the brake system under very moderate braking conditions or while the brake shoes and/or pads are advancing toward their associated brake surfaces, the resulting force acting on the proportioning piston 60 due to the difference in effective cross-sectional areas of the portions 61 and 62 is not sufficient to overcome the biasing force of the spring 66, so that the piston 60 assumes the position shown in FIG. 2. In this position, the proportioning valve does not decrease the fluid pressure, so that the outlet pressure supplied to the rear brakes of the vehicle from the port 26 is substantially equal to the pressure supplied to the inlet port 25 from the rear pressure chamber of the dual master cylinder. This portion of the operation of the valve is indicated by the line OA in FIG. 4, wherein the relationship between the inlet pressure and the outlet pressure is shown graphically.

Under more severe braking conditions, the fluid pressure in the rear circuit increases above a predetermined or trigger pressure indicated by point A in FIG. 4. When this occurs, the resulting axial force acting on the proportioning piston 60 due to the difference in effective cross-sectional areas of the portions 61 and 62 will move the piston 60 to the left against the biasing force of the spring 66. In the preferred embodiment, the spring 66 has a relatively high pre-load and a relatively low spring rate so that this movement will occur with little pressure increase when this predetermined pressure has been reached. Since the brake shoes and/or pads have already contacted their braking surfaces when this occurs, there will be very little or no flow from the inlet port 25 through the proportioning valve to the outlet port 26 as the pressures continue to increase.

With the proportioning piston 60 in this displaced position, the resilient valve head 69 engages a valve seat member 75 which is disposed in the bore 11 to isolate the inlet pressure acting on the smaller diameter portion 61 from the outlet pressure acting on the larger diameter portion 62. Then, as the inlet pressure from the master cylinder rear pressure chamber increases beyond the predetermined trigger pressure, the difference in effective cross-sectional areas between the portions 61 and 62 will result in a pressure increase in the outlet side of the valve that is less than but proportional to the pressure increase in the inlet side. The proportional relationship between the increase in inlet pressure and the increase in outlet pressure above the predetermined trigger pressure is equal to the proportional relationship between the net effective cross-sectional areas of the smaller diameter portion 61 and the larger diameter portion 62, respectively, exposed to inlet and outlet pressure. The proportional relationship between the inlet and outlet pressures during this portion of the operation is indicated by line AB in FIG. 4 and the slope of the line AB is equal to the proportional relationship between the inlet and outlet pressures. Should any make-up fluid be required downstream of the proportioning valve, for example, due to radial expansion of the hydraulic lines 8, deformation of seals, deformation of shoes and/or drums, or leakage, the piston 60 will move to the right to permit this make-up fluid to flow between the valve head 69 and the valve seat member 75. If this occurs, the pressure drop takes place across the valving members 69 and 75 so that the space between them serves as a valve throttling area.

As shown in FIG. 2, the valve seat member 75 is resiliently mounted in the bore 11 for movement to and from the valve head 69 for reasons that will be explained in detail hereinafter. The valve seat member 75 includes a generally flat radial end face 76 adjacent the valve head 69 and a generally cylindrical axially extending skirt portion 77. The skirt portion 77 is provided with a plurality of circumferentially spaced axially extending slots (not shown) to permit the skirt portion 77 to be elastically deformed radially outwardly so that it can be snapped onto an annular groove 78 provided in a projecting end portion of the right piston member 32. A coil spring 79 acts between the valve seat member 75 and the right piston member 32 to bias the valve seat member 75 to the position shown in FIG. 2.

When the brakes have been applied as described above so that point B is reached in the graphical representation shown in FIG. 4, and the brakes are subsequently released, the proportioning valve as shown in FIG. 2 operates to maintain substantially the same proportional relationship between inlet and outlet pressures as the pressures are decreasing. As described above, the proportioning piston 60 is moved to a displaced position such that the valve head 69 is adjacent the valve seat 75 while the system pressures are increasing along line AB of FIG. 4. When point B is reached and the inlet pressure is subsequently decreased, the proportioning piston 60 will remain in its displaced position due to the outlet pressure acting on the net effective cross-sectional area of the portion 62. For this reason, the outlet pressure will remain substantially constant while the inlet pressure decreases as indicated by line BC in FIG. 4. However, because the valve seat member 75 is resiliently mounted, this condition occurs only until the force unbalance acting on the proportioning piston 60 due to the decrease in inlet pressure is sufficient to move the proportioning piston to the left as shown in FIG. 2 against the bias of the valve seat member spring 79. This condition occurs at point C in FIG. 4. Because the proportioning piston 60 and valve seat member 75 are then free to move together in the bore 11 and counterbore 14, further decreases in inlet pressure will result in proportionate but smaller decreases in outlet pressure by operation of the differential areas of portions 61 and 62. This portion of the operation of the valve is indicated by line CD in FIG. 4. When point D is reached, the inlet pressure substantially equals the outlet pressure. At this point, the spring biased valve seat member 75 operates as a return flow check valve when the inlet pressure is further decreased to prevent the inlet pressure from decreasing to a pressure less than the outlet pressure. This is accomplished by the valve seat member 75 moving to the left against the bias of the spring 79 so that the valve seat member 75 is spaced from the valve head 69 to re-establish direct fluid pressure communication between the inlet and the outlet. This occurs at point D in FIG. 4, and further decreases in inlet pressure are accompanied by substantially equal decreases in outlet pressure, so that the inlet and outlet pressures may decrease to zero along line DO in FIG. 4. It may be noted that as the circuit pressures so decrease along line DO, the proportioning piston 60 will return to its spring biased position shown in FIG. 2 when the circuit pressures decrease below the predetermined trigger pressure indicated by point A on the graphical representation of FIG. 4. Although the graphical representation of the operation of the valve shown in FIG. 2 has been shown by a straight line representation in FIG. 4, in actual practice these lines might be slightly curved due to the dynamic flow characteristics of the system and due to the spring rate of springs 66 and 79.

Although under normal operating conditions the movement of the proportioning piston 60 and the valve seat member 75 to the left as described above to effect a decrease in outlet pressure proportional to a decrease in inlet pressure will be quite small, it is possible that under extraordinary conditions the proportioning piston 60 may move a sufficient distance so that annular shoulder 85 of the proportioning piston 60 engages annular shoulder 86 of the housing 10 to limit leftward movement of the proportioning piston 60. When this occurs, the spring biased valve seat member 75 further operates as a safety device because it operates as a return flow check valve to re-establish fluid pressure communication between the inlet and outlet when the inlet pressure decreases to a pressure less than the outlet pressure. Without this return flow check valve feature under such extraordinary conditions, the proportioning piston 60 would be retained in its leftmost position by the outlet pressure so that the valve head 69 would engage the valve seat member 75 and the outlet pressure would not decrease even though the inlet pressure might decrease to zero.

The first embodiment of the invention further includes a means for rendering the proportioning valve inoperable in the event of a fluid pressure unbalance such as would indicate a fluid pressure failure in the front circuit when the valve is used in the dual hydraulic brake system shown in FIG. 1. This precludes proportioning of the fluid pressure from the rear pressure chamber of the master cylinder to the rear wheel brakes if there is a failure in the front circuit so that maximum available fluid pressure can be supplied to the rear wheel brakes under such emergency conditions. In the first embodiment, this is accomplished by mounting the valve seat member 75 on the switch actuating piston assembly 30.

In the event of a fluid pressure unbalance such as would indicate a fluid pressure failure in the front circuit, the switch piston assembly 30 will be displaced to the left by the pressure differential thereacross. This causes the portion of the piston assembly adjacent the reduced diameter portion 50 to engage the contact stud 55 so that the contact stud 55 grounds the contact element 54 through the housing 10 to actuate the audio or visual warning device. This leftward movement of the piston assembly 30 also moves the valve seat 75 away from the valve head 69 a sufficient distance so that the valve head 69 cannot engage the valve seat 75 when the proportioning piston 60 is displaced to the left by the predetermined trigger pressure. When this occurs, and a sufficient force is applied to the brake pedal to cause the fluid pressure from the rear pressure chamber of the dual master cylinder to exceed the predetermined trigger pressure, the proportioning piston 60 will be displaced to the left until the annular shoulder 85 on piston 60 engages the annular shoulder 86 on the housing 10 to prevent further leftward movement of piston 60. However, because the valve seat 75 has been moved a greater distance to the left due to movement of the switch piston assembly 30, free fluid pressure communication between the inlet and the outlet will be maintained so that the proportioning valve is rendered inoperable and full fluid pressure from the master cylinder rear pressure chamber is supplied to the rear wheel brakes under such emergency conditions. It may be appreciated that this has been accomplished in the first embodiment of the invention without necessitating a bypass passage for bypassing the proportioning valve and without necessitating a valving means for closing the bypass passage.

Second embodiment

A second embodiment of a proportioning valve that may be used in the dual hydraulic brake system shown schematically in FIG. 1 is shown in FIG. 3. This second embodiment includes a valve housing 110, which is preferably of extruded brass but which alternatively may be of any other desired material. An axial bore extends from end to end through the housing 110, and includes a bore 111 in the central portion of the housing and a first counterbore 112 which extends from the bore 111 leftwardly to a left end face 113 of the housing 110. A second counterbore 114, a third counterbore 115, a fourth counterbore 116, and a fifth counterbore 117 extend rightwardly from the bore 111 to a right end face 118 of the housing 110. At the left side of the valve housing 110, a fluid inlet port 120 is provided which may be suitably connected to line 4 to receive fluid from the front pressure chamber of dual master cylinder 2. The inlet port 120 communicates with the counterbore 112 by a radial passage 121. A fluid outlet port 122 is also provided which may be suitably connected to line 5 to distribute the brake fluid from the master cylinder front pressure chamber to the slave cylinders of the two front wheels 6. The outlet port 122 communicates with the counterbore 112 by a radial passage 123. In a similar manner, on the right side of the valve housing 110 a fluid inlet port 125 is provided which may be suitably connected to line 7 to receive hydraulic brake fluid from the rear pressure chamber of dual master cylinder 2. An outlet port 126 is also provided which may be suitably connected to line 8 to distribute hydraulic brake fluid from the inlet port 126 to the two rear wheel brakes 9. Each of the described ports is threaded for receiving a suitable fitting, which is preferably of the inverted flare type.

Slidably disposed within the bore 111 is a warning switch actuating piston 130, which is of one piece construction and which may be machined from suitable brass stock. The piston 130 includes a reduced diameter central portion 131. Conical ramp surfaces 132 and 133 extend from the reduced diameter central portion 131 to larger diameter cylindrical portions 134 and 135, respectively. The larger diameter cylindrical portions 134 and 135 extend to reduced diameter end portions 136 and 137, respectively, of the switch piston 130. An annular sleeve member 140 is slidably disposed on the reduced diameter end portion 136 and is slidably received within the counterbore 112. The sleeve 140 is positioned adjacent an annular shoulder 141 formed at the junction of the bore 111 and the bore 112, and an annular shoulder 142 is formed on the piston 130 at the junction of the portions 134 and 136. In a similar manner, on the right side of the switch piston 130, an annular sleeve 143 is slidably disposed on the end portion 137 and slidably received within the counterbore 114. The annular sleeve 143 is positioned adjacent an annular shoulder 144 of the housing 110 formed at the junction of the bore 111 and the counterbore 114, and an annular shoulder 145 formed at the junction of the piston portions 135 and 137. An elastomeric O-ring seal 146 is disposed in the counterbore 112 to seal against counterbore 112 and against the piston end portion 136. The seal 146 hydraulically isolates the fluid of the front circuit in the counterbore 112 from the fluid in the rear circuit and prevents loss of fluid from the front circuit through the warning switch contact mechanism as will be described hereinafter. In a similar manner, an elastomeric O-ring seal 147 is disposed in the counterbore 114 and seals against the counterbore 114 and against the piston end portion 137. The seal 147 prevents fluid communication between the rear circuit and the front circuit and, additionally, prevents loss of fluid from the rear circuit through the warning switch contact mechanism. An end plug 148 is threadably received by the counterbore 112 and cooperates with the sealing gasket 149 to close the left end of the axial bore.

A transverse bore 150 extends from the bore 111 to a larger diameter threaded portion 151. A switch contact mechanism 152 is threadably received by the larger diameter threaded portion 151. The switch contact mechanism 152 includes a switch contact body 153 which is preferably made of an insulating material such as nylon or the like. The insulating body 153 carries a contact element 154, and a plunger 155 which projects into the bore 111 and engages the smaller diameter portion 131. The plunger 155 is of an electrically conductive material, such as brass, and is slidably disposed within the switch body 153 and the transverse bore 150. A spring biasing means (not shown) is contained within the switch body 153 and biases the plunger 155 toward the reduced diameter portion 131 as shown in FIG. 3. In this position the plunger 155 is electrically insulated from the contact element 154 and provides a centering means to bias the plunger 130 to its centered position shown in FIG. 3. The contact element 154 may be electrically connected to the ground terminal of an audio or visual warning device, so that the device will be actuated when the contact element 154 is grounded through the switch housing 110. When the piston member 130 is displaced to the right or left from the centered position shown in FIG. 3, the plunger 155 will be displaced radially outwardly by the conical ramp 132 or 133, and will rest on the larger diameter cylindrical portion 134 or 135. When this occurs, the plunger 155 electrically contacts the contact element 154 to ground the contact element 154 through the housing 110 to actuate the warning device.

When the switch piston 130 is in its centered position shown in FIG. 3, the cross-sectional area of the piston 130 exposed to the fluid pressure of the front circuit is equal to the cross-sectional area of the end portion 136 because of the arrangement of the seal 146 and because in the second embodiment the sleeve 140 engages the shoulder 141 and is slightly spaced from the shoulder 142. In a similar manner, the cross-sectional area of the switch piston 130 exposed to the fluid pressure of the rear circuit is equal to the cross-sectional area of the end portion 137 due to the seal 147 and because in the second embodiment the sleeve 143 engages the shoulder 144 and is spaced from the shoulder 145. Because these end portions 136 and 137 have substantially equal cross-sectional areas, the switch piston will be displaced from its centered position shown in FIG. 3 only when there is a substantial fluid pressure unbalance between the front and rear circuits, such as would indicate a fluid pressure failure in one or the other circuit. When the switch piston 130 is displaced to the left or right by such a pressure unbalance, it will carry with it the sleeve 140 or the sleeve 143, respectively. For example, if the piston 130 is displaced to the left, such as would indicate a fluid pressure failure in the front circuit, the piston 130 will carry with it the sleeve 140 and the seal 146. When this occurs, the effective cross-sectional area of the piston 130 exposed to the fluid pressure in the front circuit is equal to the cross-sectional area of the end portion 136 plus the annular cross-sectional area of the seal 146. In this event, the cross-sectional area of the piston 130 exposed to the fluid pressure in the front circuit exceeds the cross-sectional area of the piston 130 exposed to the fluid pressure of the rear circuit by an amount equal to the annular cross-sectional area of the gasket 146. Then, when the front circuit has been repaired so that the fluid pressures of the front and rear circuits acting on the switch piston 130 are substantially equal, the greater cross-sectional area exposed to the fluid pressure of the front circuit will move the switch piston 130 from its leftwardly disposed position back to the centered position shown in FIG. 3. This will allow the plunger 155 to return to its position shown in FIG. 3 to deactuate the warning device without requiring a manual resetting of the switch piston 130.

Slidably disposed within the right end of the axial bore in the valve housing 110 is a proportioning valve piston 160. The proportioning valve piston 160 includes a smaller diameter portion 161 and a larger diameter portion 162 slidably disposed in the counterbore 115 and the counterbore 116, respectively. Sealing engagement between the smaller diameter portion 161 and the counterbore 115 is maintained by the seal 163. In a similar manner, sealing engagement between the larger diameter portion 162 and the counterbore 116 is maintained by a seal 164. A vent passage means 165 is provided in the housing 110 to maintain the differential area between the portion 161 and the portion 162 at atmospheric pressure. A coil spring 166 acts between a retainer 167 and a snap ring 168 to bias the proportioning piston 160 to the position shown in FIG. 3. In this poition, the snap ring 168 engages the left end face of a plug member 169 which is threadably received by the counterbore 117 and which seals against the right end face 118 of the housing 110 by a seal 170. Radial passages 171 are provided in the left end face of the plug member 169 to prevent the spring clip 168 from hydraulically isolating a portion of the proportioning piston 160 by engagement with the left end face of the plug member 169. An axial passage 172 extends from end to end through the proportioning piston 160 and provides the sole means for fluid pressure communication between the inlet port 125 and the outlet port 126.

To control fluid flow through the axial passage 172, a valve head 179 is provided on the proportioning piston 160. Under low pressure conditions, such as occur in the brake system under very moderate braking conditions or while the brake shoes and/or pads are advancing toward their associated brake surfaces, the resulting force acting on the proportioning piston 160 due to the difference in effective cross-sectional areas of the portions 161 and 162 is not great enough to overcome the biasing force of the spring 166. In this event, the proportioning piston 160 assumes the spring biased position shown in FIG. 3. In this position, the proportioning valve does not decrease the fluid pressure, so that the outlet pressure supplied to 166 has a relatively high pre-load and a relatively low the rear brakes of the vehicle from the port 126 is substantially equal to the pressure supplied to the inlet 125 from the rear pressure chamber of the dual master cylinder 2. This portion of the operation of the valve is indicated by the line OA in FIG. 4 wherein the relationship between the inlet pressure and the outlet pressure is shown graphically.

Under more severe braking conditions, the fluid pressure in the rear circuit increases above a predetermined or trigger pressure, indicated by point A in FIG. 4. When this occurs, the resulting axial force acting on the proportioning piston 160 due to the difference in effective cross-sectional areas of the portions 161 and 162 will move the piston 160 to the left against the biasing force of the spring 166. In the preferred embodiment, the spring spring rate so that this movement will occur with little pressure increase when this predetermined pressure has been reached. Since the brake shoes and/or pads have already contacted their braking surfaces when this occurs, there will be very little or no flow from the inlet port 125 through the proportioning valve to the outlet port 126 as the pressures continue to increase.

With the proportioning piston 160 in this displaced position, the valve head 179 engages a valve seat member 180 which is disposed in the axial bore to isolate the inlet pressure acting on the smaller diameter portion 161 from the outlet pressure acting on the larger diameter portion 162. The valve seat member 180 may be of any suitable material to provide sealing engagement with the valve head 179. In the preferred embodiment, the valve seat member 180 is of nylon. Then, as the inlet pressure from the master cylinder rear pressure chamber increases beyond the predetermined trigger pressure, the difference in effective cross-sectional areas between the portions 161 and 162 results in a further pressure increase in the outlet side of the valve that is less than, but proportional to, the further pressure increase in the inlet side. The proportional relationship between the increase in inlet pressure and the increase in outlet pressure above the predetermined trigger pressure is equal to the proportional relationship between the net effective cross sectional area of the smaller diameter portion 161 and the area of the larger diameter portion 162, respectively, exposed to inlet and outlet pressure. The proportional relationship between the inlet and outlet pressures during this portion of the operation is indicated by line AB in FIG. 4, and the slope of line AB is equal to the proportional relationship between the inlet and outlet pressures. Should any make-up fluid be required downstream of the proportioning valve, for example, due to radial expansion of the hydraulic lines 8, deformation of seals, deformation of shoes and/or drums, or leakage, the piston 160 will move to the right to permit this make-up fluid to flow between the valve head 179 and the valve seat member 180. If this occurs, the pressure drop takes place across the valving members 179 and 180 so that the space between them serves as a valve throttling area.

As shown in FIG. 3, the valve seat member 180 is resiliently mounted in the axial bore for movement to and from the valve head 179 for reasons that will be explained in detail hereinafter. The valve seat member includes a generally flat radial end face 181 adjacent the valve head 179. A reduced diameter projecting end portion 182 of the valve seat member 180 is slidably received in an axial bore 183 which extends from the right end face of the switch piston portion 137. A C-shaped spring clip 184 is provided on the outside of end portion 137 and has ends projecting radially inward into bore 183 at a reduced diameter portion 188 of valve seat member 180 to retain the valve seat member 180 in the axial bore 183. A coil spring 185 acts between the piston 130 and the valve seat member 180 to bias the valve seat member 180 to the right hand position as shown in FIG. 3.

When the brakes have been applied as described above so that point B is reached in the graphical representation shown in FIG. 4, and the brakes are subsequently released, the proportioning valve as shown in FIG. 3 operates to maintain substantially the same proportional relationship between inlet and outlet pressures as the pressures are decreasing. When point B is reached and the inlet pressure is subsequently decreased, the proportioning piston 160 will remain in its displaced position due to the outlet pressure acting on the net effective cross-sectional area of the portion 162. For this reason, the outlet pressure will remain substantially constant while the inlet pressure decreases as indicated by line BC in FIG. 4. However, because the valve seat member 180 is resiliently mounted, this condition occurs only until the force unbalance acting on the proportioning piston 160 due to the decrease in inlet pressure is sufficient to move the proportioning piston to the left as shown in FIG. 3 against the bias of the valve seat member spring 185. This condition occurs at point C in FIG. 4. Because the proportioning piston 160 and valve seat member 180 are then free to move together in the counterbores 115 and 116, further decreases in inlet pressure will result in proportionate but smaller decreases in outlet pressure by operation of the differential areas of portions 161 and 162. This portion of the operation of the valve is indicated by line CD in FIG. 4. When point D is reached, the inlet pressure substantially equals the outlet pressure. At this point, the spring biased valve seat member 180 operates as a return flow check valve when the inlet pressure is further decreased to prevent the inlet pressure from decreasing to a pressure less than the outlet pressure. This is accomplished by the valve seat member 180 moving to the left against the bias of the spring 185 so that the valve seat member 180 is spaced from the valve head 179 to re-establish direct fluid pressure communication between the inlet and the outlet. This occurs at point D in FIG. 4, and further decreases in inlet pressure are accompanied by substantially equal decreases in outlet pressure, so that the inlet and outlet pressures may decrease to zero along line DO in FIG. 4. Although the graphical representation of the operation of the valve shown in FIG. 2 has been shown by a straight line representation in FIG. 4, in actual practice these lines might be slightly curved due to the dynamic flow characteristics of the system and due to the spring rate of springs 166 and 185.

Although under normal operating conditions the movement of the proportioning piston 160 and the valve seat member 180 to the left as described above to effect a decrease in outlet pressure proportional to a decrease in inlet pressure will be quite small, it is possible that under extraordinary conditions the proportioning piston 160 may move a sufficient distance so that annular shoulder 186 of the proportioning piston 160 engages annular shoulder 187 of the housing 110 to limit leftward movement of the proportioning piston 160. When this occurs, the spring biased valve seat member 180 further operates as a safety device in the same manner as valve seat member 75 of the first embodiment because it operates as a return flow check valve to re-establish fluid pressure communication between the inlet and outlet when the inlet pressure decreases to a pressure less than the outlet pressure.

The second embodiment of the invention further includes a means for rendering the proportioning valve inoperable in the event of a fluid pressure unbalance such as would indicate a fluid pressure failure in the front circuit when the valve is used in the dual hydraulic brake system shown in FIG. 1. This precludes proportioning of the fluid pressure from the rear pressure chamber of the dual master cylinder to the rear wheel brakes if there is a failure in the front circuit so that the maximum available fluid pressure can be supplied to the rear wheel brakes under such emergency conditions. In the second embodiment, this is accomplished by mounting the valve seat member 180 on the switch actuating piston 130 as shown in FIG. 3.

In the event of a fluid pressure unbalance such as would indicate a fluid pressure failure in the front circuit, the switch piston 130 will be displaced on the left by the pressure differential thereacross. This causes the plunger 155 to be displaced radially outwardly to ground the contact element 154 through the housing 110 to actuate the audio or visual warning device. This leftward movement of the switch piston 130 also moves the valve seat 180 away from the valve head 179 a sufficient distance so that the valve head 179 cannot engage the valve seat member 180 when the proportioning piston 160 is displaced to the left by the predetermined trigger pressure. When this occurs, and a sufficient force is applied to the brake pedal to cause the fluid pressure in the rear pressure chamber of the dual master cylinder 2 to exceed the predetermined pressure, the proportioning piston 160 will be displaced to the left until the annular shoulder 186 on the piston 160 engages the annular shoulder 187 on the housing 110 to prevent further leftward movement of piston 160. However, because the valve seat member 180 has been moved a greater distance to the left due to movement of the switch piston 130, free fluid pressure communication between the inlet and the outlet will be maintained so that the proportioning valve is rendered inoperable and full fluid pressure from the master cylinder rear pressure chamber is supplied to the rear wheel brakes 9 under such emergency conditions. It may be appreciated that this is accomplished in the second embodiment of the invention without necessitating a bypass passage for bypassing the proportioning valve and without necessitating a valving means for closing the bypass passage. After the failure in the front circuit has been repaired, the switch piston 130 will return to its centered position shown in FIG. 3 and the proportioning valve will operate in the manner described above.

The fluid pressures supplied from the dual master cylinder 2 to the lines 4 and 7 are generally substantially equal in the absence of a fluid pressure failure in one of the circuits. However, it is possible that these pressures can become unequal under transient conditions without a failure in one of the circuits. Such a transient fluid pressure unbalance may occur, for example, due to the action of the duel master cylinder if a pressure buildup in one of the pressure chambers is required to effect a corresponding pressure build-up in the other pressure chamber. The presence of air in one of the circuits may also cause such a transient fluid pressure unbalance, because an initial fluid flow would be required to the circuit having air in the line while at the same time the fluid pressure in the other circuit is rapidly building up.

Regardless of the cause of such a transient fluid pressure unbalance, it may be appreciated that it could at least momentarily displace the switch piston 130 from its centered position to actuate the warning switch contact mechanism 152. If the transient fluid pressure unbalance displaces the switch piston to the right, it would be possible for the valve seat to engage the valve head of the proportioning valve to preclude further flow to the rear wheel brakes 9. To preclude this, the second embodiment of the invention is provided with a stop means 190. The stop means 190 in the second embodiment is a tubular member slidably disposed within the axial passage 172. A sufficient clearance between the outer diameter of the tubular member 190 and the inner diameter of the passage 172 is maintained to provide a fluid flow passage 191 therebetween. The plug member 169 is provided with a plurality of radial passages 192 to insure free fluid pressure communication between the fluid flow passage 191 and the outlet port 126. In the second embodiment shown in FIG. 3, the tubular member 190 is arranged such that its left end projects beyond the valve head 179 when the piston 160 is in the extreme right position. In this manner, if the switch piston 130 is displaced to the right in the event of a transient fluid pressure unbalance, the valve seat 180 will engage the stop means 190 and not make sealing contact with the valve head 179. This insures that free fluid communication will be maintained from inlet port 125 through the fluid flow passage 191 and the radial passages 192 to the outlet port 126 when the switch piston 130 is displaced to the right in response to such a transient fluid pressure unbalance. When the system conditions stabilize and fluid pressure balance is again obtained, the hydraulic centering action described above will return the switch piston 130 to its centered position shown in FIG. 3. Since the stop means 190 projects only slightly beyond the valve head 179 and is slidable with respect to piston 160, it will not interfere with the operation of the proportioning piston 160 described above when the piston moves to the left.

Although two specific embodiments of the invention have been shown in the drawings and described in detail, various modifications and rearrangements may be made without departing from the scope of the invention.

I claim:

1. A valve comprising a housing having a bore therein, a fluid inlet communicating with said bore, a fluid outlet communicating with said bore, a valve seat member disposed in said bore and axially movable therein, piston means slidably mounted in said bore for movement to and from said valve seat member, said piston means including a passage extending axially from the end adjacent said valve seat member at least partially through said piston means, the end of said piston means around said axial passage defining a valve head cooperating with said valve seat member to control fluid from said fluid inlet to said fluid outlet through said passage, a spring operable to bias said piston means in one direction to a first position away from said valve seat member, said piston means having differential area means exposed to the fluid pressures of said fluid inlet and said fluid outlet, said differential area means being operable by differential forces to move said piston means valve head in another direction opposite said one direction from said first position into sealing engagement with said valve seat member to isolate said fluid inlet from said fluid outlet when a predetermined pressure obtains in said fluid inlet, spring means biasing said valve seat member toward said piston means valve head, said valve seat member and said piston means valve head being movable together in said other direction against the bias of said spring means to increase the volume of said fluid outlet so that said differential area means operates to maintain decreases in said fluid outlet pressure in a predetermined proportional relation to decreases in said fluid inlet pressure, said valve seat member being thereafter further movable in said other direction away from said valve head against the bias of said spring means when the fluid pressure in said fluid outlet is greater than the fluid pressure in said fluid inlet to establish fluid communication between said fluid inlet and said fluid outlet, a switch piston in said housing for actuating an electric switch mechanism in response to movement of said switch piston resulting from a fluid pressure differential across said switch piston, and said valve seat member being carried by said switch piston.

2. A valve as set forth in claim 1 wherein said switch piston is slidably disposed in said bore for movement in either direction from a centered position and arranged such that movement of said switch piston in said bore in a direction away from said piston means to actuate said electric switch mechanism moves said valve seat member away from said valve head to prevent said isolation of said fluid inlet from said fluid outlet when said predetermined pressure is reached.

3. A valve as set forth in claim 2, wherein said valve seat member is slidably carried by said switch piston, and said spring means acts between said switch piston and said valve seat member.

4. A valve as set forth in claim 3, wherein said spring means and said valve seat member are received by and carried by a projecting end portion of said switch piston.

5. A valve comprising a housing having a bore therein, a first fluid inlet communicating with said bore, a fluid outlet communicating with said bore, a valve seat member disposed in said bore and axially movable therein, piston means slidably mounted in said bore for movement to and from said valve seat member, a passage extending axially at least partially through said piston means, one end of said piston means around said axial passage defining a valve head cooperating with said valve seat member to control fluid flow from said first fluid inlet to said fluid outlet through said passage, a spring operable to bias said piston means in one direction to a first position away from said valve seat member, said piston means having differential area means exposed to the fluid pressure of said first fluid inlet and said fluid outlet, said differential area means being operable by differential forces to move said piston means valve head in another direction opposite said one direction from said first position into sealing engagement with said valve seat member to isolate said first fluid inlet from said fluid outlet when a predetermined pressure obtains in said first fluid inlet, a second fluid inlet to said bore, a switch actuating piston in said bore intermediate said fluid inlets for actuating an electric switch contact mechanism in response to movement of said switch actuating piston resulting from a fluid pressure differential across said switch actuating piston, said valve seat member being moved away from said valve head by movement of said switch actuating piston in said other direction so that said valve head cannot engage said valve seat member when said valve head is moved by said differential forces, said valve seat member and said piston means valve head being movable together in said other direction against the bias of said spring means to increase the volume of said fluid outlet so that said differential area means operates to maintain decreases in said fluid outlet pressure in a predetermined proportional relation to decreases in said first fluid inlet pressure, stop means engageable by said piston means for limiting said movement of said piston means valve head in said other direction, and said valve seat being further movable in said other direction away from said valve head when said stop means is engaged by said piston means and the fluid pressure in said fluid outlet is greater than the fluid pressure in said first fluid inlet to establish fluid communication between said first fluid inlet and said fluid outlet.

6. A valve as set forth in claim 5 wherein said switch actuating piston is slidably disposed in said bore for movement in either direction from a centered position, and said valve seat member is carried by said switch actuating piston.

References Cited

UNITED STATES PATENTS

| 3,441,318 | 4/1969 | Bueler | 303—6 C |
|---|---|---|---|
| 3,448,230 | 6/1969 | Bueler | 303—6 C X |
| 3,472,559 | 10/1969 | Bueler | 303—6 C |
| 3,556,607 | 1/1971 | Shutt et al. | 303—6 C |

MILTON BUCHLER, Primary Examiner

J. J. McLAUGHLIN, Assistant Examiner

U.S. Cl. X.R.

188—151 A, 349; 200—82 D; 303—84 A; 340—52 C

UNITED STATES PATENT OFFICE
CERTIFICATE OF CORRECTION

Patent No. 3,667,810  Dated June 6, 1972

Inventor(s) R. J. Silagy

It is certified that error appears in the above-identified patent and that said Letters Patent are hereby corrected as shown below:

In the ABSTRACT, Column 1, line 12, change "proportioning" to -- proportional -- .

Column 4, line 1, change "position" to --piston --. Column 12, line 1, cancel "166 has a relatively high pre-load and a relatively low" -- .

Column 12, line 16, after "spring" (second occurrence) insert --166 has a relatively high pre-load and a relatively low -- .

Column 15, line 31, after "fluid" (first occurrence) insert -- flow -- .

Signed and sealed this 27th day of February 1973.

(SEAL)
Attest:

EDWARD M. FLETCHER, JR.
Attesting Officer

ROBERT GOTTSCHALK
Commissioner of Patents